US008100792B2

(12) United States Patent
Kawahara et al.

(10) Patent No.: US 8,100,792 B2
(45) Date of Patent: Jan. 24, 2012

(54) HYDRAULIC AUTO-TENSIONER

(75) Inventors: Kazunori Kawahara, Nishio (JP); Yasuyuki Uchida, Aichi (JP); Yuji Kato, Okazaki (JP); Takayoshi Ota, Okazaki (JP); Hiroyuki Kawara, Toyota (JP)

(73) Assignees: Otics Corporation, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 538 days.

(21) Appl. No.: 12/308,071

(22) PCT Filed: Jul. 27, 2007

(86) PCT No.: PCT/JP2007/065306
§ 371 (c)(1),
(2), (4) Date: Dec. 5, 2008

(87) PCT Pub. No.: WO2008/018395
PCT Pub. Date: Feb. 14, 2008

(65) Prior Publication Data
US 2009/0298628 A1 Dec. 3, 2009

(30) Foreign Application Priority Data
Aug. 10, 2006 (JP) ................................ 2006-218699

(51) Int. Cl.
*F16H 7/08* (2006.01)
*F16H 7/22* (2006.01)

(52) U.S. Cl. ....................................... 474/110; 474/109

(58) Field of Classification Search .................. 474/101, 474/109–110, 113–118, 133–138
See application file for complete search history.

(56) References Cited

U.S. PATENT DOCUMENTS 4,790,801 A * 12/1988 Schmidt et al. ............... 474/110
4,997,410 A * 3/1991 Polster et al. ................. 474/110
5,967,923 A * 10/1999 Petri .............................. 474/138
(Continued)

FOREIGN PATENT DOCUMENTS
JP 9-203447 8/1997
(Continued)

OTHER PUBLICATIONS

PCT/IB/308.

*Primary Examiner* — William A Rivera
(74) *Attorney, Agent, or Firm* — McGinn IP Law Group, PLLC

(57) ABSTRACT

A hydraulic auto-tensioner includes a high-pressure oil chamber and a low-pressure oil chamber, and oil (L) in the high-pressure oil chamber passes through a clearance (G) between a cylinder (17) and a piston portion (18) of a plunger and leaks into the low-pressure oil chamber from an end of the clearance (G) near an end surface of the cylinder (17). A recessed groove (40) is provided in an inner peripheral surface of the cylinder (17) by a conical surface (41) having a groove angle of 5 to 15 degrees from the end of the clearance (G), a throttle portion (45) projecting onto the piston portion (18) side is provided further toward the end surface side of the cylinder than the groove (40) in the inner peripheral surface of the cylinder (17), and a throttle gap (A) larger than the clearance (G) is formed between the throttle portion (45) and the piston portion (18).

20 Claims, 9 Drawing Sheets

U.S. PATENT DOCUMENTS

| | | | |
|---|---|---|---|
| 6,106,424 A * | 8/2000 | Kratz | 474/110 |
| 7,241,239 B2 * | 7/2007 | Tanaka | 474/110 |
| 7,686,717 B2 * | 3/2010 | Grunau et al. | 474/110 |
| 2005/0049093 A1 * | 3/2005 | Sato et al. | 474/101 |
| 2005/0064970 A1 * | 3/2005 | Tanaka | 474/110 |
| 2005/0130777 A1 | 6/2005 | Grunau et al. | |
| 2006/0281595 A1 * | 12/2006 | Narita et al. | 474/109 |
| 2008/0220918 A1 * | 9/2008 | Namie et al. | 474/110 |
| 2010/0105506 A1 * | 4/2010 | Rointru | 474/110 |
| 2011/0111898 A1 * | 5/2011 | Mishima | 474/101 |

FOREIGN PATENT DOCUMENTS

| | | |
|---|---|---|
| JP | 2001-116092 | 4/2001 |
| JP | 2001-221306 | 8/2001 |

\* cited by examiner

HYDRAULIC AUTO-TENSIONER

TECHNICAL FIELD

The present invention relates to a hydraulic auto-tensioner for automatically applying appropriate tension to a transmission member such as a belt or chain.

BACKGROUND ART

As shown in FIG. 8, in many hydraulic auto-tensioners 100, a low-pressure oil chamber 106 is formed between a casing 101 and a cylinder 102 provided on the inside thereof, a high-pressure oil chamber 105 pressed by a plunger 103 is formed in the interior of the cylinder 102, and by biasing a return spring 104 in a direction for causing the plunger 103 to retreat, oil L flows in a single direction from the low-pressure oil chamber 106 to the high-pressure oil chamber 105 via a check valve 107. Meanwhile, during an overload, when the plunger 103 advances deeply into the cylinder 102, the oil L in the high-pressure oil chamber 105 leaks into the low-pressure oil chamber 106 through a clearance G between the cylinder 102 and a piston portion 111 of the plunger 103 from an end of the clearance G near an upper end surface of the cylinder 102.

However, when the up-down stroke of the plunger 103 is large or the frequency is high during the overload, the oil L is ejected forcefully from the end of the clearance G into the air above the oil L in the low-pressure oil chamber 106 through a tapered opening 110 formed at the end of an inner peripheral surface of the cylinder 102, as shown in FIG. 9, and falls into the oil L in the low-pressure oil chamber 106 after mingling with the air. As a result, the amount of air 109 mixed into the oil L in the low-pressure oil chamber 106 gradually increases. Eventually, the air 109 flows into the high-pressure oil chamber 105 through the check valve 107 together with the oil L, and as a result, a backlash corresponding to the volume of the air 109 is generated in the plunger 103, leading to deterioration of the auto-tensioner function, an increase in vibration of the belt or the like serving as the subject of tension application, and abnormal noise. Various devices have been proposed in response to this air problem.

As a device for forestalling air mingling, Japanese Patent Application Publication No. H9-203447 describes a device in which a ring-shaped ejection groove is provided in recessed form in the inner peripheral surface of the upper portion of a cylinder, an ejection hole is formed to penetrate the groove bottom of the ejection groove, and oil L in a high-pressure oil chamber is discharged directly into the oil L in a low-pressure oil chamber from a clearance and through the ejection groove and the ejection hole.

Further, as a device for dealing with the occurrence of air mingling, Japanese Patent Application Publication No. 2001-116092 describes a device in which a baffle is provided in a low-pressure oil chamber to form a narrow gap, through which oil can pass but air bubbles are unlikely to pass, between itself and a casing. Thus, air bubbles mixed into the oil in the low-pressure oil chamber are prevented from entering a high-pressure oil chamber.

DISCLOSURE OF THE INVENTION

However, in the device employing the ejection hole in Japanese Patent Application Publication No. H9-203447, the ejection hole functions as a bypass passage midway through the clearance so as to vary the ejection speed of the oil from the high-pressure oil chamber, and therefore the conventional design of the clearance must be modified. Further, the device employing the baffle in Japanese Patent Application Publication No. 2001-116092 is a method of dealing with air mingling after the air mingling has occurred.

An object of the present invention is to solve the problems described above by providing a hydraulic auto-tensioner which is capable of reducing the mingling of air with oil, thereby preventing deterioration of the auto-tensioner function and the occurrence of abnormal noise, without affecting the conventional design of a clearance.

In order to solve the aforementioned problems, the hydraulic auto-tensioner of the present invention is provided with a high-pressure oil chamber pressed by a piston portion of a plunger in the interior of a cylinder, and a low-pressure oil chamber capable of communicating with the high-pressure oil chamber via a check valve, and oil in the high-pressure oil chamber passes through a clearance between the cylinder and the piston portion and leaks into the low-pressure oil chamber from an end of the clearance near an end surface of the cylinder. Furthermore, in the hydraulic auto-tensioner, a recessed groove is provided in an inner peripheral surface of the cylinder by a conical surface extending from the end of the clearance to the end surface side of the cylinder and having a groove angle ($\theta$) of 5 to 15 degrees relative to a length direction of the inner peripheral surface, a throttle portion projecting onto the piston portion side is provided further toward the end surface side of the cylinder than the groove in the inner peripheral surface of the cylinder, and a throttle gap (A) which is larger than the clearance (G) is formed between the throttle portion and the piston portion.

[Actions]
(1) A recessed groove formed by a conical surface having a shallow groove angle range from the end of a clearance such as that described above is capable of weakening (reducing) the momentum (flow rate) of oil ejected from the end of the clearance through a diffuser action with no significant oil release, and therefore foaming of the oil is suppressed. Note, however, that a certain amount of foaming is inevitable.
(2) Furthermore, a throttle portion provided further toward the end surface side of a cylinder than the groove and a throttle gap (A), which is larger than the clearance, formed between the throttle portion and a piston portion act in such a manner that the throttle portion throttles the foam contained in the oil that has been weakened in momentum by the groove, whereupon the oil is allowed to flow through the throttle gap (A). The throttle portion may be ring-shaped or shaped as an interrupted ring cut into sections.

As a result of the actions (1) and (2) described above, mingling of air (in the form of the aforementioned foam) with the oil that is ejected from the end of the clearance is reduced, and therefore deterioration of the auto-tensioner function and the occurrence of abnormal noise can be prevented.

Here, to improve the action (2), a maximum depth (E) of the groove is preferably set at no less than 0.15 mm, a protruding throttle height (C) of the throttle portion is preferably set at no less than 0.1 mm, and the throttle gap (A) is preferably set to be between 3 and 10 times larger than the clearance (G). For this purpose, a length (D) of the groove (the length thereof in the same direction as the length direction of the cylinder) is preferably set in accordance with a groove angle ($\theta$) such that the maximum depth (E) of the groove is no less than 0.15 mm. Note that there are no particular limitations on a length (B) of the throttle portion (the length thereof in the same direction as the length direction of the cylinder).

According to the hydraulic auto-tensioner of the present invention, the mingling of air with oil can be reduced, thereby preventing deterioration of the auto-tensioner function and the occurrence of abnormal noise, without affecting the conventional design of the clearance.

BEST MODE FOR CARRYING OUT THE INVENTION

Figure 1:
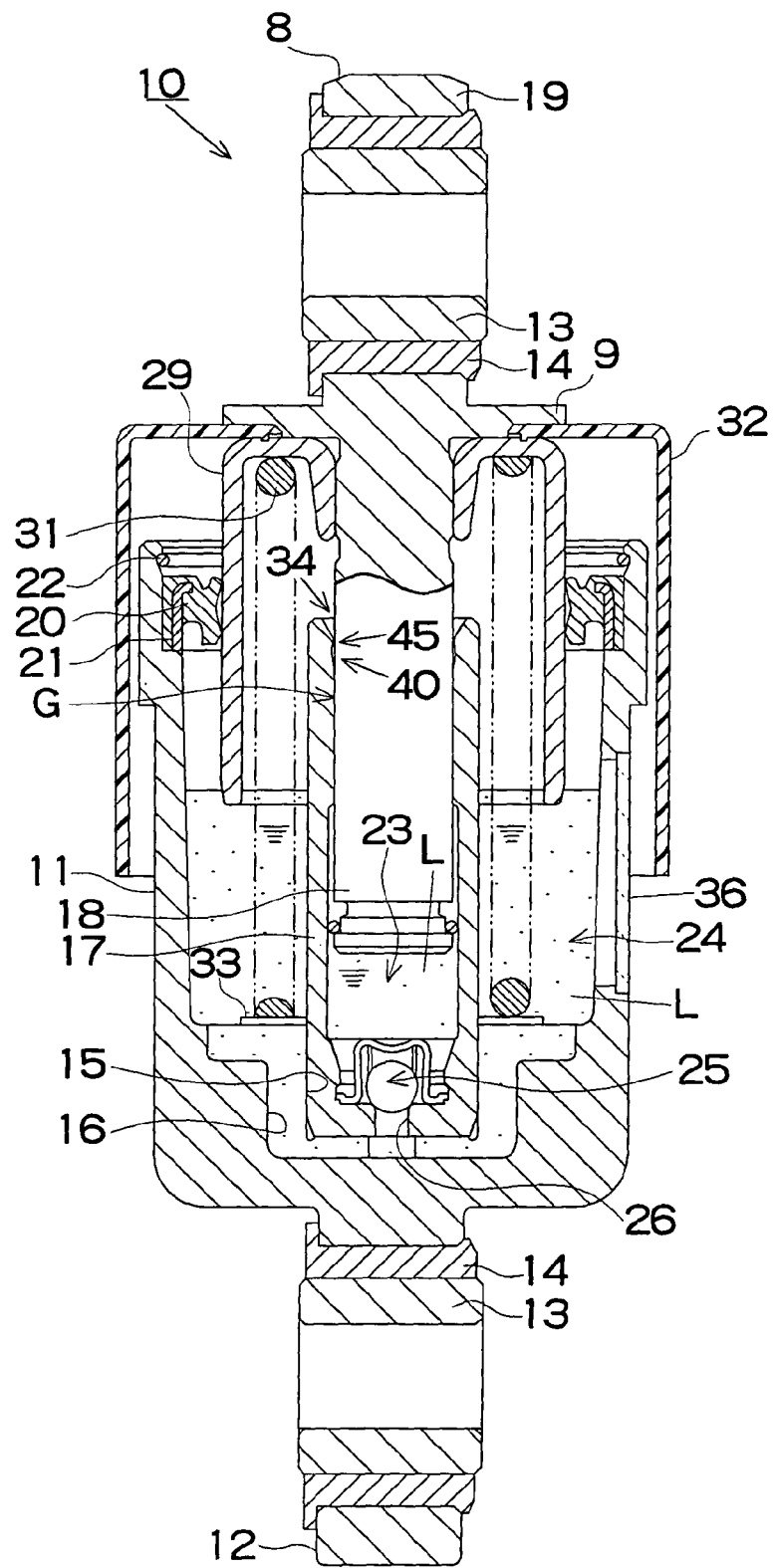
FIG. 1 is a sectional view showing an embodiment of a hydraulic auto-tensioner according to the present invention.

A hydraulic auto-tensioner 10 is provided with a high-pressure oil chamber 23 pressed by a piston portion 18 of a plunger 8 in the interior of a cylinder 17, and a low-pressure oil chamber 24 capable of communicating with the high-pressure oil chamber 23 via a check valve 25, and oil L in the high-pressure oil chamber 23 passes through a clearance G between the cylinder 17 and the piston portion 18 of the plunger 8 and leaks into the low-pressure oil chamber 24 from an end of the clearance G near an end surface of the cylinder 17. In the hydraulic auto-tensioner 10, a recessed groove 40 is provided in an inner peripheral surface of the cylinder 17 by a conical surface 41 extending from the end of the clearance G to the end surface side of the cylinder 17 and having a groove angle θ of 5 to 15 degrees relative to a length direction of the inner peripheral surface, a ring-shaped throttle portion 45 projecting onto the piston portion 18 side is provided further toward the end surface side of the cylinder 17 than the groove in the inner peripheral surface of the cylinder 17, and a throttle gap A which is larger than the clearance G is formed between the throttle portion 45 and the piston portion 18.

EXAMPLES

A specific embodiment of the hydraulic auto-tensioner according to the present invention will be described below with reference to FIGS. 1 to 3. A hydraulic auto-tensioner 10 according to this embodiment has a casing 11 in the shape of a closed-end tube, and a ring-shaped collar 13 is provided on an attachment portion 12 formed integrally with a lower surface of the casing 11 so as to be capable of rotating via a dry bearing 14. An insertion receiving portion 15 having a reduced diameter is provided on an inner peripheral lower portion of the casing 11, and an oil groove 16 is formed in a recessed manner in an inner peripheral surface of the insertion receiving portion 15 and an inner bottom surface of the casing 11.

A closed-end cylinder 17 having a slightly smaller outer diameter than the inner diameter of the casing 11 is inserted into the casing 11, and a lower end portion thereof is forcibly inserted into and fixed to the insertion receiving portion 15. A rod-shaped piston portion 18 provided on a lower end portion of a plunger 8 is inserted into the inside of the cylinder 17 from an open end portion of the casing 11 so as to be capable of sliding vertically. A ring-shaped collar 13 is provided on an attachment portion 19 at an upper end portion of the plunger 8 so as to be capable of rotating via a dry bearing 14, and the collar 13 is connected to an arm 4 shown in FIG. 2, for example.

A high-pressure oil chamber 23 is formed between the cylinder 17 and the lower end surface of the piston portion 18 so as to be pressed by the piston portion 18, and a low-pressure oil chamber 24 is formed between the outer peripheral surface of the cylinder 17 and the inner peripheral surface of the casing 11. An appropriate amount of oil L is introduced into the high-pressure oil chamber 23 and the low-pressure oil chamber 24 such that air exists in the upper portion of the low-pressure oil chamber 24. The high-pressure oil chamber 23 and the low-pressure oil chamber 24 are capable of unidirectional communication from the low-pressure oil chamber 24 to the high-pressure oil chamber 23 via a communication hole 26 provided in a bottom wall of the cylinder 17, a check valve 25 provided on the high-pressure oil chamber 23 side thereof, and the aforementioned oil groove 16.

Further, a clearance G having a narrow ring-shaped cross-section and serving as a leak passage is provided between the cylinder 17, which serves as a partition wall for partitioning the high-pressure oil chamber 23 and the low-pressure oil chamber 24, and the piston portion 18 of the plunger 8. The oil in the high-pressure oil chamber 23 is caused to pass through the clearance G and leak (flow out) into the low-pressure oil chamber 24 from an end of the clearance G near the end surface of the cylinder 17. A gap α of the clearance G is preferably set at an average value of approximately 0.01 to 0.04 mm, and in this embodiment is set at 0.025 mm. Note, however, that the gap α of the clearance G need not be fixed around its entire circumference, and may include parts that are larger and smaller than the average value.

A spring cover 29 formed in one piece from a longer outer tube inserted into an opening in the casing 11, a shorter inner tube forcibly inserted into the outer periphery of the plunger 8, and a ceiling portion sealing the upper end portions of the two tubes is forcibly inserted into and fixed to the upper portion of the plunger 8 below the attachment portion 19. A return spring 31 is mounted in a compressed state between the lower surface of the ceiling portion of the spring cover 29 and a spring sheet 33 disposed on the upper surface of the insertion receiving portion 15 so as to urge the plunger 8 upward (in a retreating direction). A seal ring 20 that slidably contacts the outer tube of the spring cover 29 is mounted on a stepped portion on the inner periphery of the open end portion of the casing 11, and the seal ring 20 is latched to a stopper ring 22 fitted into a groove on the same inner periphery of the open end portion of the casing 11 in a manner that prevents disengagement thereof. The reference numeral 21 denotes an insert fitting of the seal ring 20.

A resin dust cover 32 covering the open end portion of the casing 11 (in particular, the spring cover 29 and the seal ring 20) from the plunger 8 and extending to the outer periphery of the casing 11 is attached to the upper portion of the plunger 8 beneath the attachment portion 19, and the dust cover 32 moves up and down together with the plunger 8.

Figure 3A:
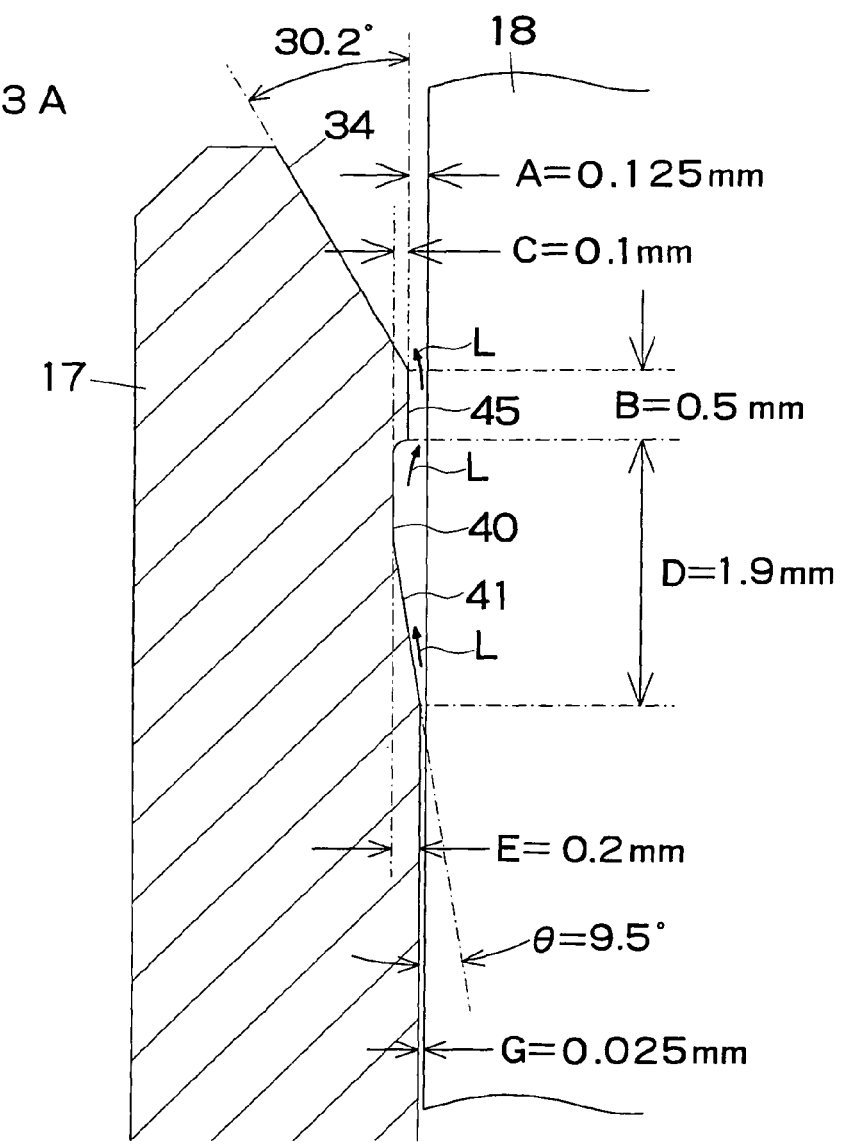
FIG. 3A is an enlarged sectional view of an oil ejection site according to this embodiment.

As shown in FIG. 3A, a feature of this embodiment is that a recessed groove 40 is provided in the inner peripheral surface of the cylinder 17 by a conical surface 41 extending from the end of the clearance G to the end surface side of the cylinder 17 and having a groove angle θ of 5 to 15 degrees relative to a length direction of the inner peripheral surface, a ring-shaped throttle portion 45 projecting onto the piston portion 18 side is provided further toward the end surface side of the cylinder 17 than the groove 40 in the inner peripheral surface of the cylinder 17, and a throttle gap A that is larger than the clearance G is formed between the throttle portion 45 and the piston portion 18.

More specifically, the groove 40 has a groove angle θ of 9.5 degrees, a groove length D (the length thereof in the same direction as the length direction of the cylinder) of 1.9 mm, and a maximum groove depth E of 0.2 mm. The throttle portion 45 has a projecting throttle height C of 0.1 mm, a throttle gap A of 0.125 mm (approximately three to five times the clearance G is appropriate), and a length B (the length thereof in the same direction as the length direction of the cylinder) of 0.5 mm.

Substantially similarly to the conventional example, a tapered opening 34 which increases in diameter at an angle of approximately 30 degrees relative to the length direction of the inner peripheral surface of the cylinder 17 is formed further toward the end surface side of the cylinder 17 than the throttle portion 45 in the inner peripheral surface of the cylinder 17.

The hydraulic auto-tensioner 10 structured as described above is used in the manner shown in FIG. 2, for example. In this example, a V belt 1 is wrapped around a pulley 2 and an idler pulley 3. The idler pulley 3 is attached rotatably to a tip end of the arm 4, and a base end of the arm 4 is attached to a shaft portion 5 so as to be capable of swinging. The hydraulic auto-tensioner 10 is connected to a central portion of the arm 4.

Figure 2A:
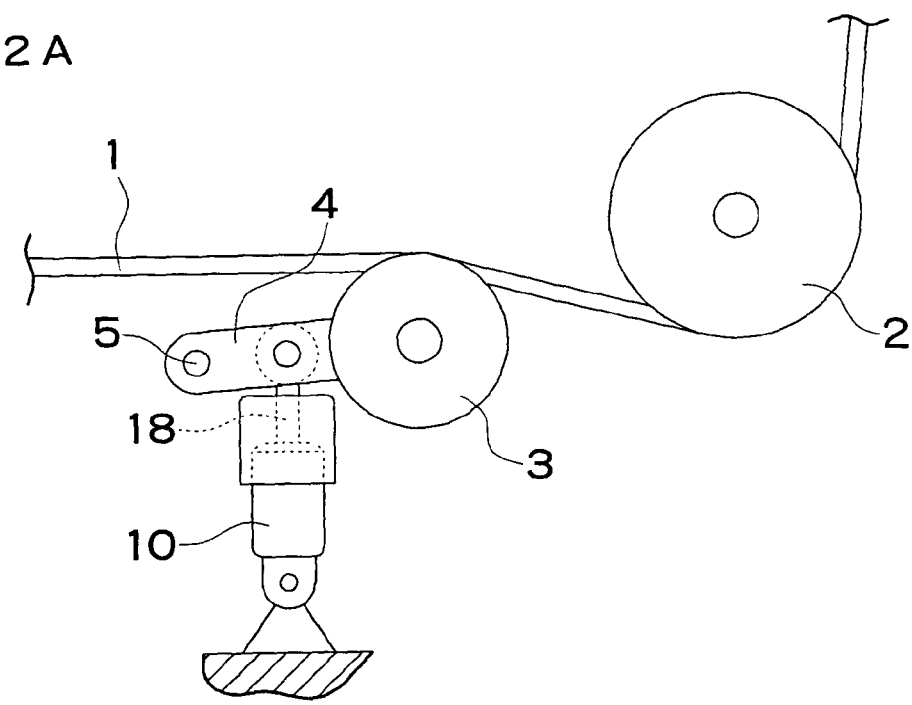
FIG. 2 is a schematic diagram illustrating an example of use of this embodiment.

When the tension of the V belt 1 becomes excessively small, the V belt 1 allows the plunger 8 to be displaced upward by the return spring 31 via the idler pulley 3 and the arm 4 such that the piston portion 18 displaces in a retreating direction from the cylinder 17, as shown in FIG. 2A. As a result, the pressure in the high-pressure oil chamber 23 becomes temporarily lower than the pressure in the low-pressure oil chamber 24, the check valve 25 opens, and the oil in the low-pressure oil chamber 24 passes through the oil groove 16 to flow into the high-pressure oil chamber 23 through the communication hole 26. Thus, an appropriate amount of tension is applied to the V belt 1.

Figure 2B:
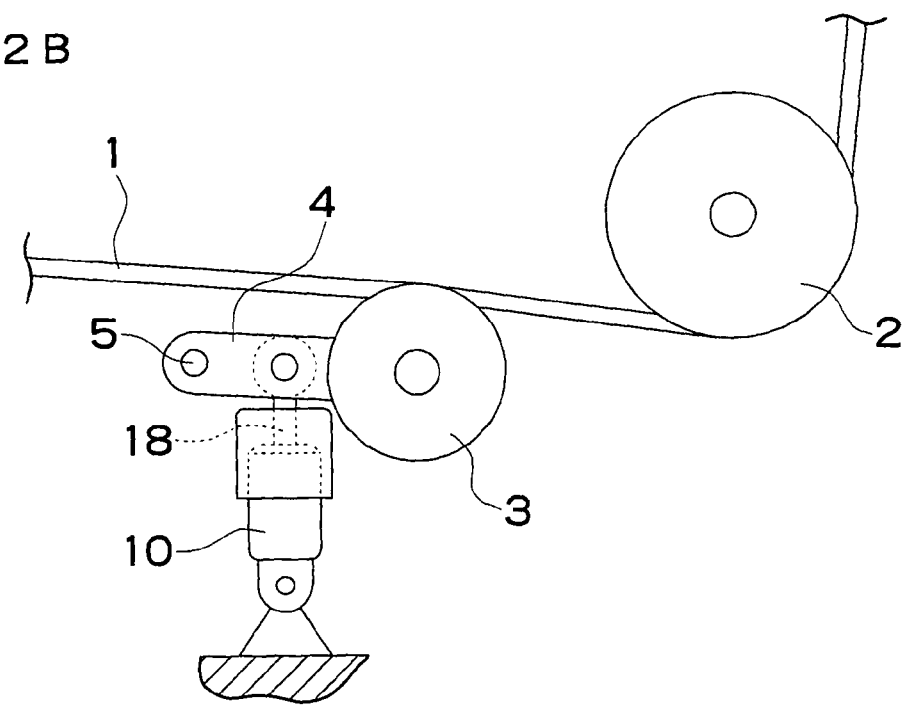

On the other hand, when the tension of the V belt 1 is excessively large due to an overload or the like, the V belt 1 pushes the plunger 8 downward forcefully via the idler pulley 3 and the arm 4. As a result, the oil in the high-pressure oil chamber 23 leaks into the low-pressure oil chamber 24 through the clearance G, as shown in FIG. 2B. Thus, the piston portion 18 is able to advance deeply into the cylinder 17, and therefore, variation in the belt length can be absorbed (automatically adjusted) at the same time as the tension of the V belt 1 decreases.

When the tension is excessively high and the up-down stroke of the plunger 8 is large or the frequency is high, the oil L in the high-pressure oil chamber 23 is ejected from the end of the clearance G. In this embodiment, however, the recessed groove 40 is provided in the inner peripheral surface of the cylinder 17 by the conical surface 41 having the shallow angle θ, the ring-shaped throttle portion 45 is provided so as to project to the piston portion 18 side, and the throttle gap A, which is larger than the clearance G, is provided between the throttle portion 45 and piston portion 18. Therefore, as described above in the "Actions" section, the oil L that is ejected from the end of the clearance G flows into the low-pressure oil chamber 24 with reduced air mingling due to the following actions (1) and (2). As a result, deterioration of the auto-tensioner function and the occurrence of abnormal noise, which are caused by air mingling, can be prevented.

(1) The groove 40 is capable of weakening (reducing) the momentum (flow rate) of the oil L ejected from the end of the clearance G through a diffuser action with no significant oil release, and therefore foaming of the oil L is suppressed. Note, however, that a certain amount of foaming is inevitable.

(2) Furthermore, the throttle portion 45 and the throttle gap A act in such a manner that the throttle portion 45 throttles the foam contained in the oil L that has been weakened in momentum by the groove 40, whereupon the oil is allowed to flow through the throttle gap A.

Figure 3B:
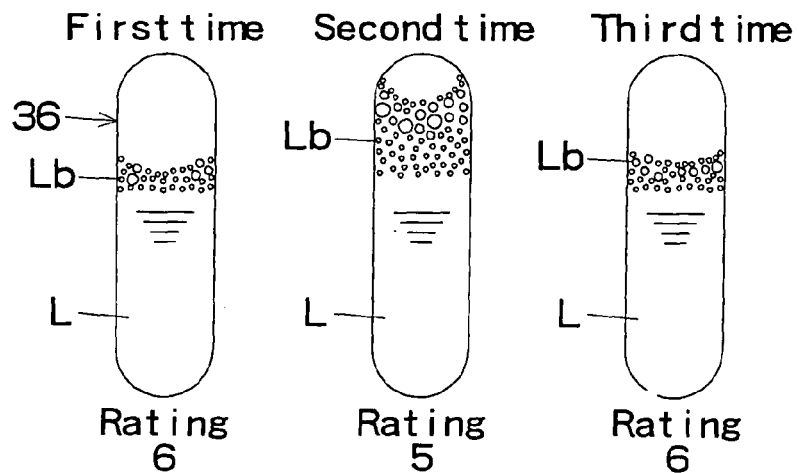
FIG. 3B is a view showing the result of a sight test.

To confirm these effects, a sight test was performed by providing a transparent window 36 on a side wall of the casing 11 and observing the foaming condition of the oil L in the low-pressure oil chamber 24 through the transparent window 36 while causing the tensioner to expand and contract repeatedly for approximately 10 minutes in the state shown in FIGS. 2A and 2B. FIG. 3B shows the results of three tests, and it can be seen from these results that a favorable condition, wherein a small amount of foam Lb floated on the oil surface of the oil L in the low-pressure oil chamber 24, was achieved. A particularly small amount of foam Lb was obtained in the first and third tests, and therefore this condition was given the highest rating of 6. The condition of a first comparative example to be described below, in which the largest amount of foam Lb was obtained, was given the lowest rating of 1, and conditions therebetween were rated from 1 to 6.

Similar sight tests to that of the embodiment described above were then performed on first through fourth comparative examples, shown in FIGS. 4 to 7, and the results thereof were checked and compared. These comparative examples differ from the embodiment described above merely in the shape and structure of the end portion of a cylinder 102 serving as the oil ejection site, and all other portions are identical to their counterparts in the embodiment.

Figure 4A:
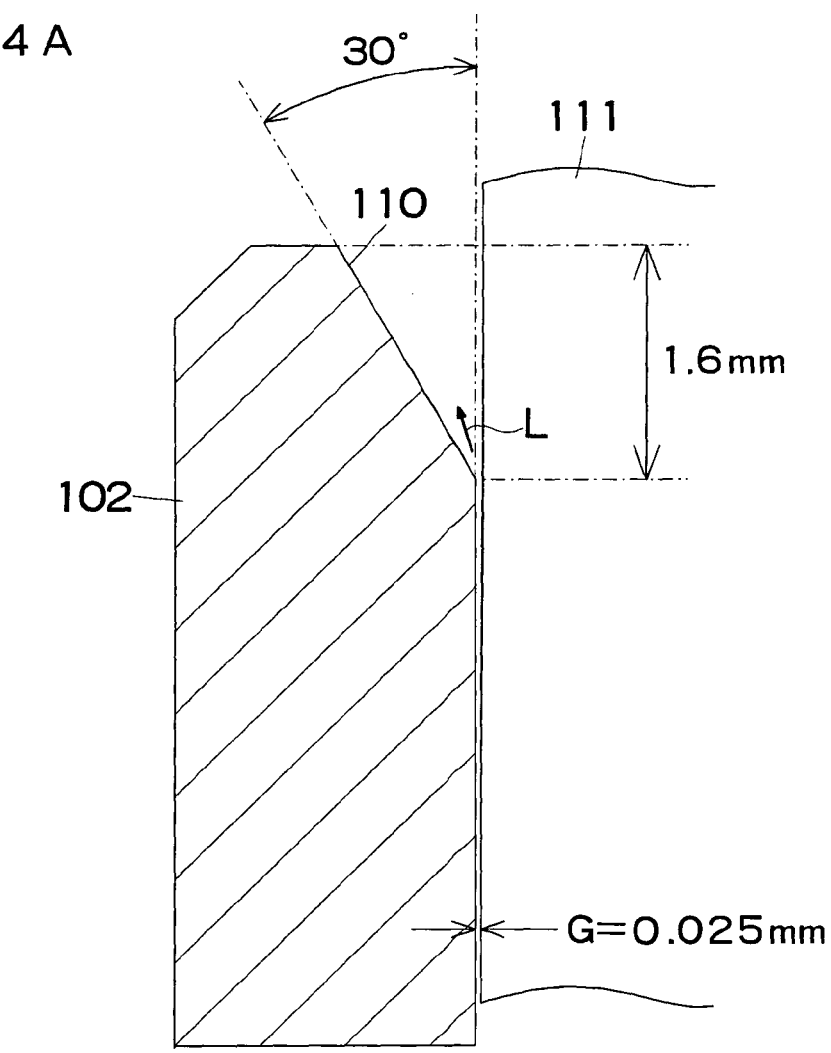
FIG. 4A is an enlarged sectional view of an oil ejection site according to a first comparative example.
Figure 4B:
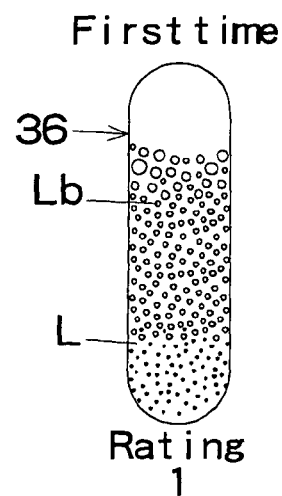
FIG. 4B is a view showing the result of a sight test.

The first comparative example shown in FIG. 4 is identical to the conventional example described above, in which a tapered opening 110 that increases in diameter at an angle of 30 degrees relative to the length direction of the inner peripheral surface of the cylinder 102 from the end of the clearance G is formed on the end portion of the inner peripheral surface of the cylinder 102. Components corresponding to the groove 40 and the throttle portion 45 of the embodiment are not provided. As shown in FIG. 4B, the result of the sight test shows a poor condition in which a large amount of foam Lb is mixed into the oil L in the low-pressure oil chamber 24 from the oil surface to the bottom portion, and therefore, as described above, a rating of 1 was given.

Figure 5A:
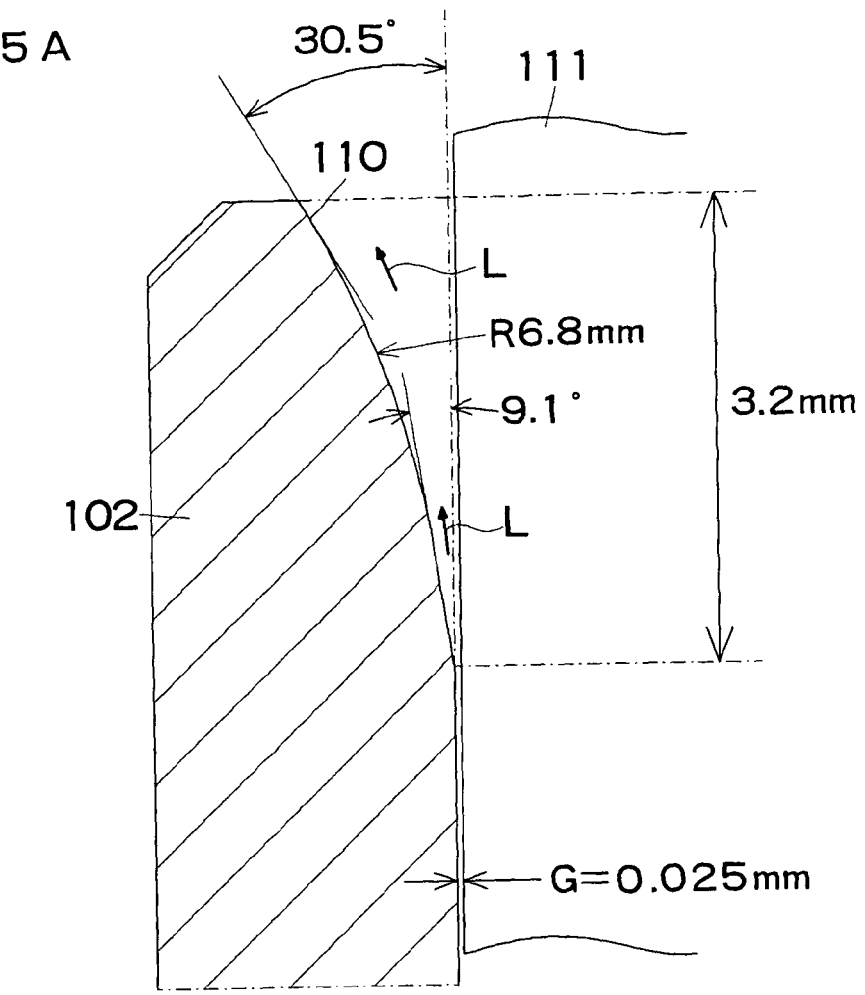
FIG. 5A is an enlarged sectional view of an oil ejection site according to a second comparative example.
Figure 5B:
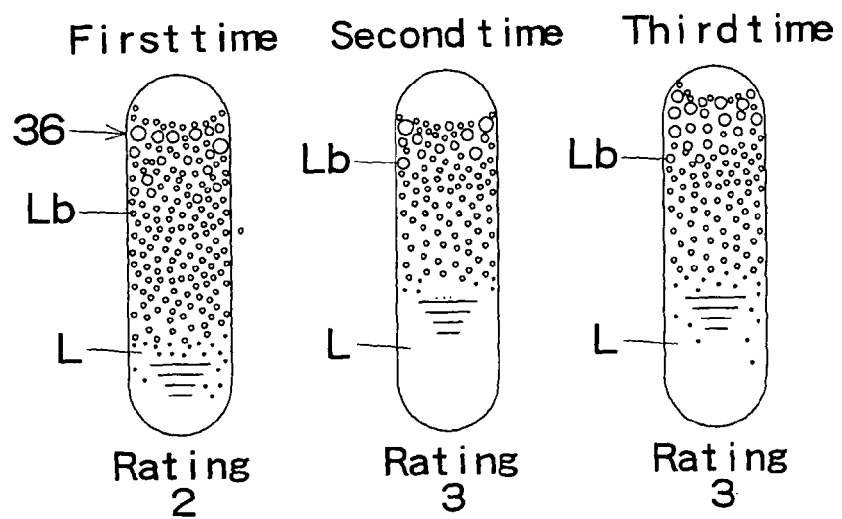
FIG. 5B is a view showing the result of a sight test.

The tapered opening 110 formed in the second comparative example shown in FIG. 5 begins to increase in diameter at an angle of 9.1 degrees relative to the length direction of the inner peripheral surface of the cylinder 102 from the end of the clearance G, curves midway by R6.8 mm, and finally forms an angle of 30.5 degrees relative to the length direction of the inner peripheral surface of the cylinder 102. As shown in FIG. 5B, the result of the sight test shows a condition in which a large amount of foam Lb is mixed into the oil L in the low-pressure oil chamber 24 from the oil surface to an approximately central depth level, and therefore a rating of 2 or 3 was given. In the second comparative example, it is considered that, the tapered opening 110, which tapers gently and continuously from the end of the clearance G, exhibits an action corresponding to that of the conical surface 41 of the groove 40 in the embodiment, and therefore mingling of the foam Lb is reduced below that of the first comparative example. However, a component corresponding to the throttle portion 45 of the embodiment is not provided, and therefore mingling of the foam Lb occurs to a greater extent than in the embodiment.

Figure 6A:
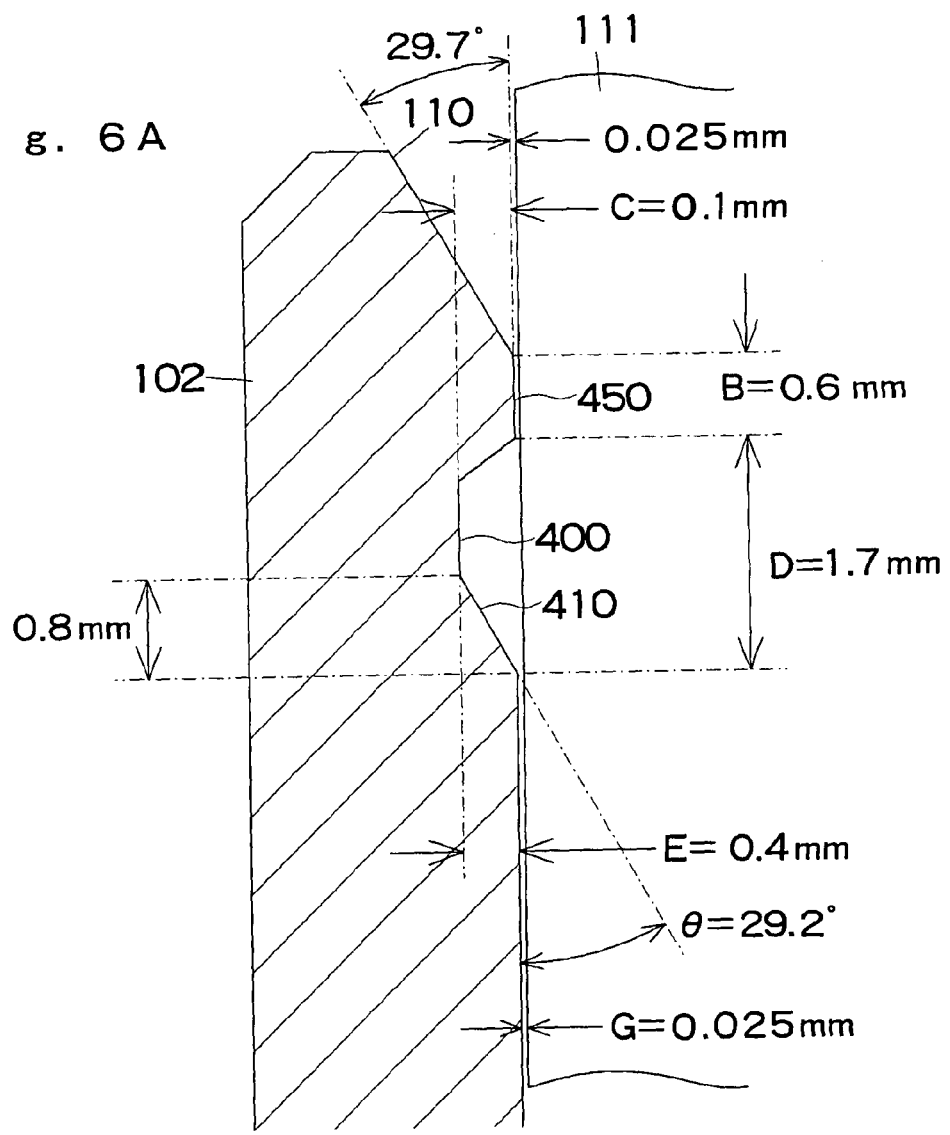
FIG. 6A is an enlarged sectional view of an oil ejection site according to a third comparative example.
Figure 6B:
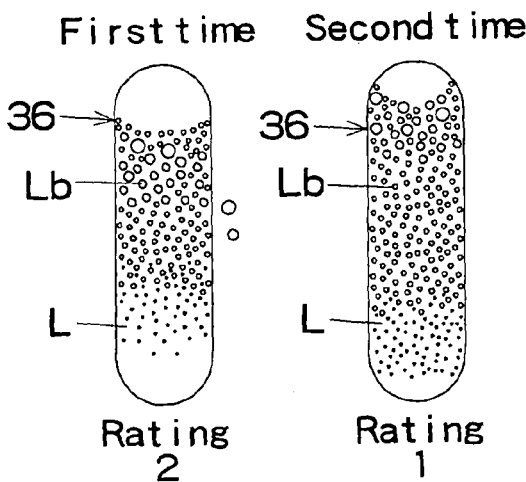
FIG. 6B is a view showing the result of a sight test.

In the third comparative example shown in FIG. 6, a recessed groove 400 is provided by a conical surface 410, which forms a groove angle θ of 29.2 degrees relative to the length direction of the inner peripheral surface of the cylinder 102 from the end of the clearance G, a ring-shaped convex portion 450 is provided so as to project onto a piston portion 111 side, and a gap of 0.025 mm, which is identical to the clearance G, is formed between the convex portion 450 and the piston portion 111. As shown in FIG. 6B, the result of the sight test shows a poor condition similar to that of the first comparative example, and therefore a rating of 1 or 2 was given. Even though the groove 400 and the convex portion 450 are provided in the third comparative example, the conditions thereof are different to the groove and throttle portion of the present invention, and therefore the actions (1) and (2) are not exhibited sufficiently.

Figure 7A:
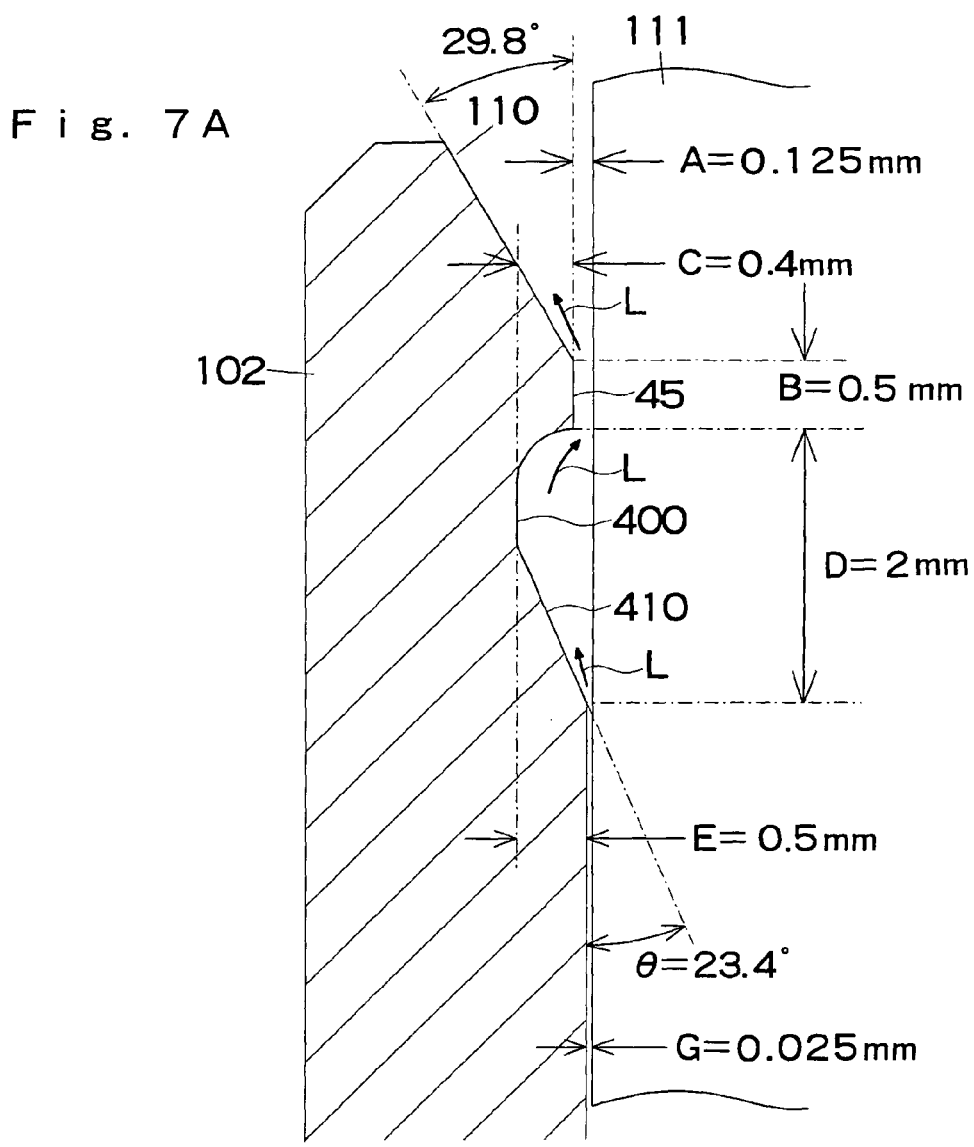
FIG. 7A is an enlarged sectional view of an oil ejection site according to a fourth comparative example.
Figure 7B:
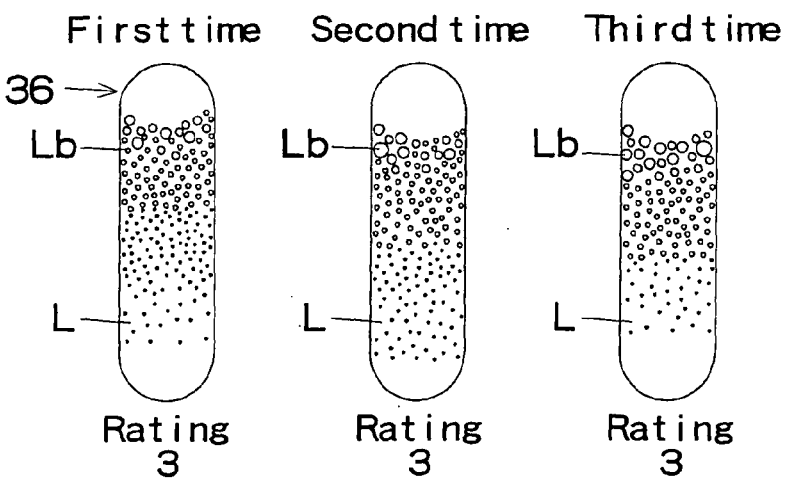
FIG. 7B is a view showing the result of a sight test.
Figure 8:
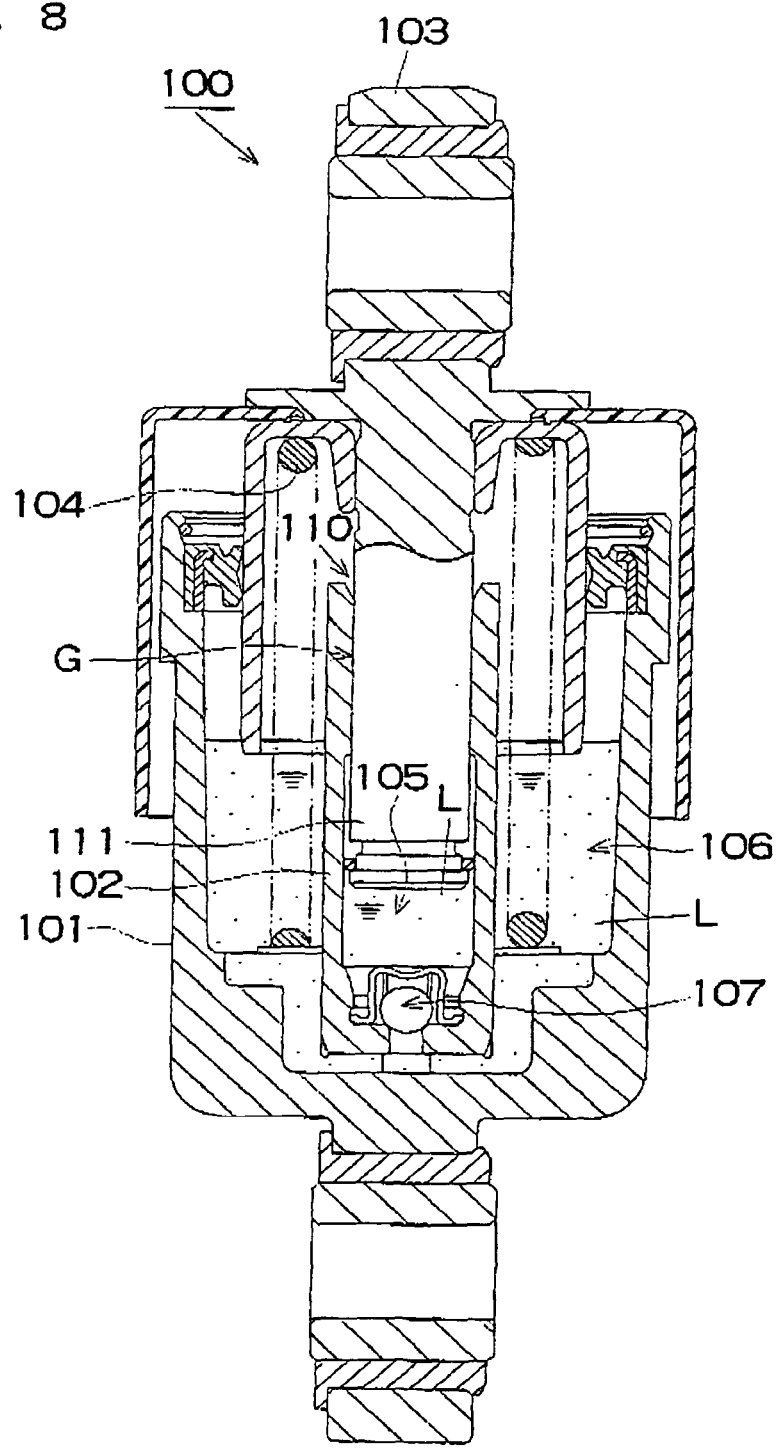
FIG. 8 is a sectional view showing a hydraulic auto-tensioner according to a conventional example.
Figure 9:
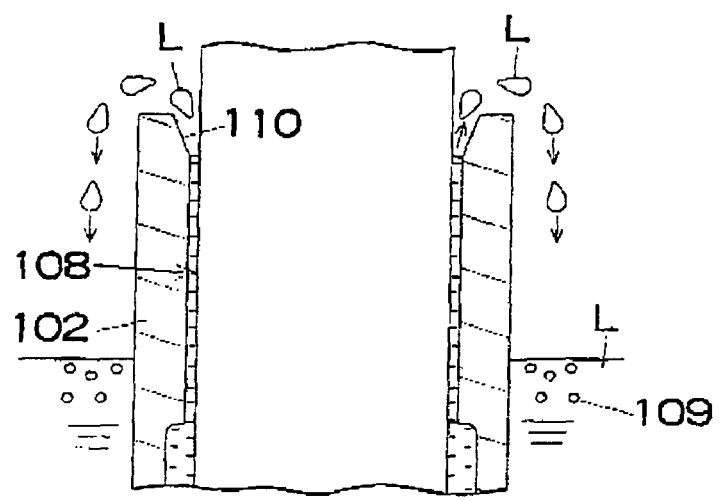
FIG. 9 is a sectional view showing the ejection of oil according to the conventional example.

In the fourth comparative example shown in FIG. 7, the recessed groove 400 is provided by the conical surface 410, which forms a groove angle θ of 23.4 degrees relative to the length direction of the inner peripheral surface of the cylinder 102 from the end of the clearance G, the ring-shaped throttle portion 45 is provided so as to project onto a piston portion 111 side, and a gap A of 0.125 mm, which is larger than the clearance G, is formed between the throttle portion 45 and the piston portion 111. As shown in FIG. 7B, the result of the sight test shows a similar condition to that of the second comparative example, and therefore a rating of 3 was given. Even though the fourth comparative example is provided with the throttle portion 45 of the present invention, the conditions of the groove 400 differ from the groove of the present invention, and therefore the action (1) is not exhibited sufficiently. From this result, the necessity of exhibiting both action (1) and action (2) can be understood.

Note that the present invention is not limited to the embodiment described above, and may be implemented after modifying the structure of each portion appropriately within a scope that does not depart from the spirit of the present invention.

The invention claimed is:

1. A hydraulic auto-tensioner, comprising:
a high-pressure oil chamber pressed by a piston portion of a plunger in an interior of a cylinder; and
a low-pressure oil chamber capable of communicating with the high-pressure oil chamber via a check valve, in which oil in the high-pressure oil chamber passes through a clearance between the cylinder and the piston portion and leaks into the low-pressure oil chamber from an end of the clearance near an end surface of the cylinder,
wherein a recessed groove is provided in an inner peripheral surface of the cylinder by a conical surface extending from the end of the clearance to the end surface side of the cylinder and having a groove angle of 5 to 15 degrees relative to a length direction of the inner peripheral surface, a throttle portion projecting onto the piston portion side is provided further toward the end surface side of the cylinder than the groove in the inner peripheral surface of the cylinder, and a throttle gap which is larger than the clearance, is formed between the throttle portion and the piston portion.

2. The hydraulic auto-tensioner according to claim 1, wherein a maximum depth of the groove is set at no less than 0.15 mm, a projecting throttle height of the throttle portion is set at no less than 0.1 mm, and the throttle gap is set to be 3 to 10 times larger than the clearance.

3. The hydraulic auto-tensioner according to claim 1, wherein a bottom area of the conical surface coincides with the end of the clearance and an upper area of the conical surface connects to the throttle portion.

4. The hydraulic auto-tensioner according to claim 1, wherein the throttle portion has a ring shape.

5. The hydraulic auto-tensioner according to claim 1, wherein the throttle portion extends in the length direction of the inner peripheral surface with a constant diameter from an end of the recessed groove to a tapered opening formed at the end surface side of the cylinder.

6. The hydraulic auto-tensioner according to claim 1, wherein the throttle gap remains constant in the length direction of the inner peripheral surface from an end of the recessed groove to a tapered opening formed at the end surface side of the cylinder.

7. The hydraulic auto-tensioner according to claim 1, wherein the groove angle is about 9.5 degrees relative to the length direction of the inner peripheral surface.

8. The hydraulic auto-tensioner according to claim 1, wherein the throttle gap is between three to five times of the clearance.

9. The hydraulic auto-tensioner according to claim 1, wherein a length of the groove in the length direction of inner peripheral surface is set in accordance with the groove angle.

10. The hydraulic auto-tensioner according to claim 1, wherein, when a pressure in the high-pressure oil chamber is lower than a pressure in the low-pressure oil chamber, the check valve opens, and the oil in the low-pressure oil chamber flows into the high-pressure oil chamber.

11. A hydraulic auto-tensioner, comprising:
a high-pressure oil, chamber pressed by a piston portion in an interior of a cylinder; and
a low-pressure oil chamber communicating with the high-pressure oil chamber via a check valve, in which oil in the high-pressure oil chamber passes through a clearance between the cylinder and the piston portion and leaks into the low-pressure oil chamber from an end of the clearance near an end surface of the cylinder,
wherein a recessed groove is provided in an inner peripheral surface of the cylinder by a conical surface extending from the end of the clearance to the end surface side of the cylinder and having a slanted groove angle relative to a length direction of the inner peripheral surface, a throttle portion projecting onto the piston portion side is provided further toward the end surface side of the cylinder than the groove in the inner peripheral surface of the cylinder, and a throttle gap, which is larger than the clearance, is formed between the throttle portion and the piston portion.

12. The hydraulic auto-tensioner according to claim 11, wherein the groove angle is between 5 and 15 degrees relative to the length direction of the inner peripheral surface.

13. The hydraulic auto-tensioner according to claim 11, wherein a bottom area of the conical surface coincides with the end of the clearance and an upper area of the conical surface connects to the throttle portion.

14. The hydraulic auto-tensioner according to claim 11, wherein the throttle portion has a ring shape.

15. The hydraulic auto-tensioner according to claim 11, wherein the throttle portion extends in the length direction of the inner peripheral surface with a constant diameter from an end of the recessed groove to a tapered opening formed at the end surface side of the cylinder.

16. The hydraulic auto-tensioner according to claim 11, wherein the throttle gap remains constant in the length direction of the inner peripheral surface from an end of the recessed groove to a tapered opening formed at the end surface side of the cylinder.

17. The hydraulic auto-tensioner according to claim 11, wherein the groove angle is about 9.5 degrees relative to the length direction of the inner peripheral surface.

18. The hydraulic auto-tensioner according to claim 11, wherein the throttle gap is between three to five times of the clearance.

19. The hydraulic auto-tensioner according to claim 11, wherein a length of the groove in the length direction of inner peripheral surface is set in accordance with the groove angle.

20. The hydraulic auto-tensioner according to claim 11, wherein, when a pressure in the high-pressure oil chamber is lower than a pressure in the low-pressure oil chamber, the check valve opens, and the oil in the low-pressure oil chamber flows into the high-pressure oil chamber.

* * * * *